(No Model.)  3 Sheets—Sheet 1.

E. G. & A. C. LATTA.
VELOCIPEDE.

No. 325,420.  Patented Sept. 1, 1885.

Witnesses.
Chas. J. Buchheit
Theo. L. Popp

Inventors.
E. G. Latta
A. C. Latta
By Wilhelm & Bonner, Attorneys.

(No Model.) 3 Sheets—Sheet 2.
E. G. & A. C. LATTA.
VELOCIPEDE.
No. 325,420. Patented Sept. 1, 1885.
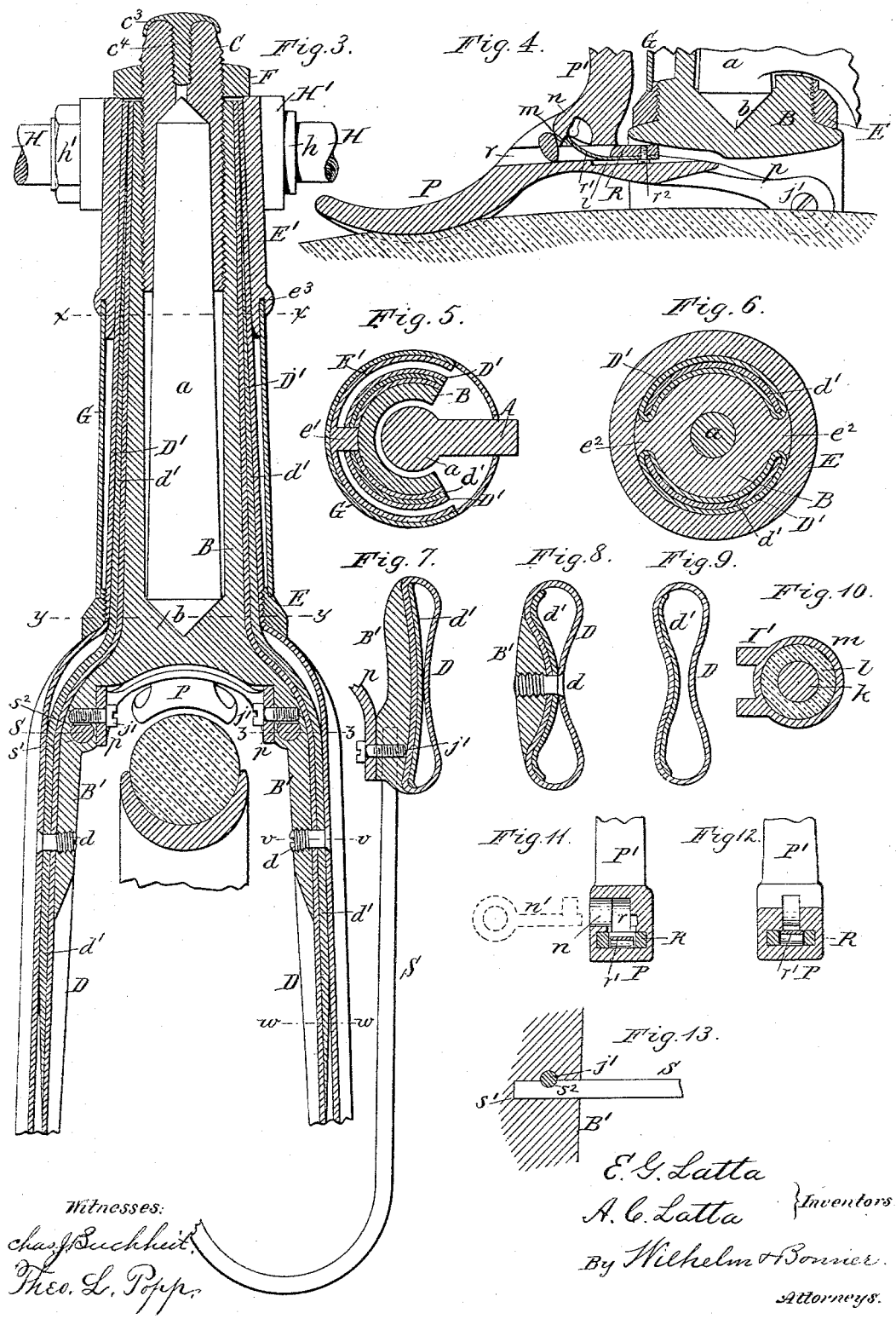
Witnesses:
Chas. J. Buchheit
Theo. L. Popp
E. G. Latta
A. C. Latta } Inventors
By Wilhelm & Bonner
Attorneys (No Model.) 3 Sheets—Sheet 3.

E. G. & A. C. LATTA.
VELOCIPEDE.

No. 325,420. Patented Sept. 1, 1885.

UNITED STATES PATENT OFFICE.

EMMIT G. LATTA AND ADRIAN C. LATTA, OF FRIENDSHIP, NEW YORK, ASSIGNORS TO THE POPE MANUFACTURING COMPANY, OF HARTFORD, CONNECTICUT.

VELOCIPEDE.

SPECIFICATION forming part of Letters Patent No. 325,420, dated September 1, 1885.

Application filed August 2, 1884. (No model.)

*To all whom it may concern:*

Be it known that we, EMMIT G. LATTA and ADRIAN C. LATTA, of Friendship, in the county of Allegany and State of New York, have invented new and useful Improvements in Velocipedes, of which the following is a specification.

Our invention relates to certain improvements in the construction of the steering-head of the machine and in the manner of securing the forks to the head, whereby the forks are strengthened and the general appearance of the parts improved and repairs greatly facilitated; also, in the manner of securing the front end of the saddle to the head, whereby the greater part of the weight of the rider is thrown upon the forks and the centers relieved from the strain, and the steering of the machine rendered easy, and whereby the saddle may be set at any desired inclination when turning curves; also, in a simple and efficient locking device, whereby the brake may be made to lock the driving-wheel and prevent the latter from turning; also, to improve the construction of the brake and in the manner of securing the brake to the machine; also, in constructing the handle-bars in two parts that are interchangeable, and in the manner of securing the handle-bars to the steering-head, whereby they can be readily removed or set at any desired angle, and temporarily used when broken.

Our invention consists, to these ends, of the improvements in the construction of the machine which will be hereinafter fully set forth, and pointed out in the claims.

Figure 1:
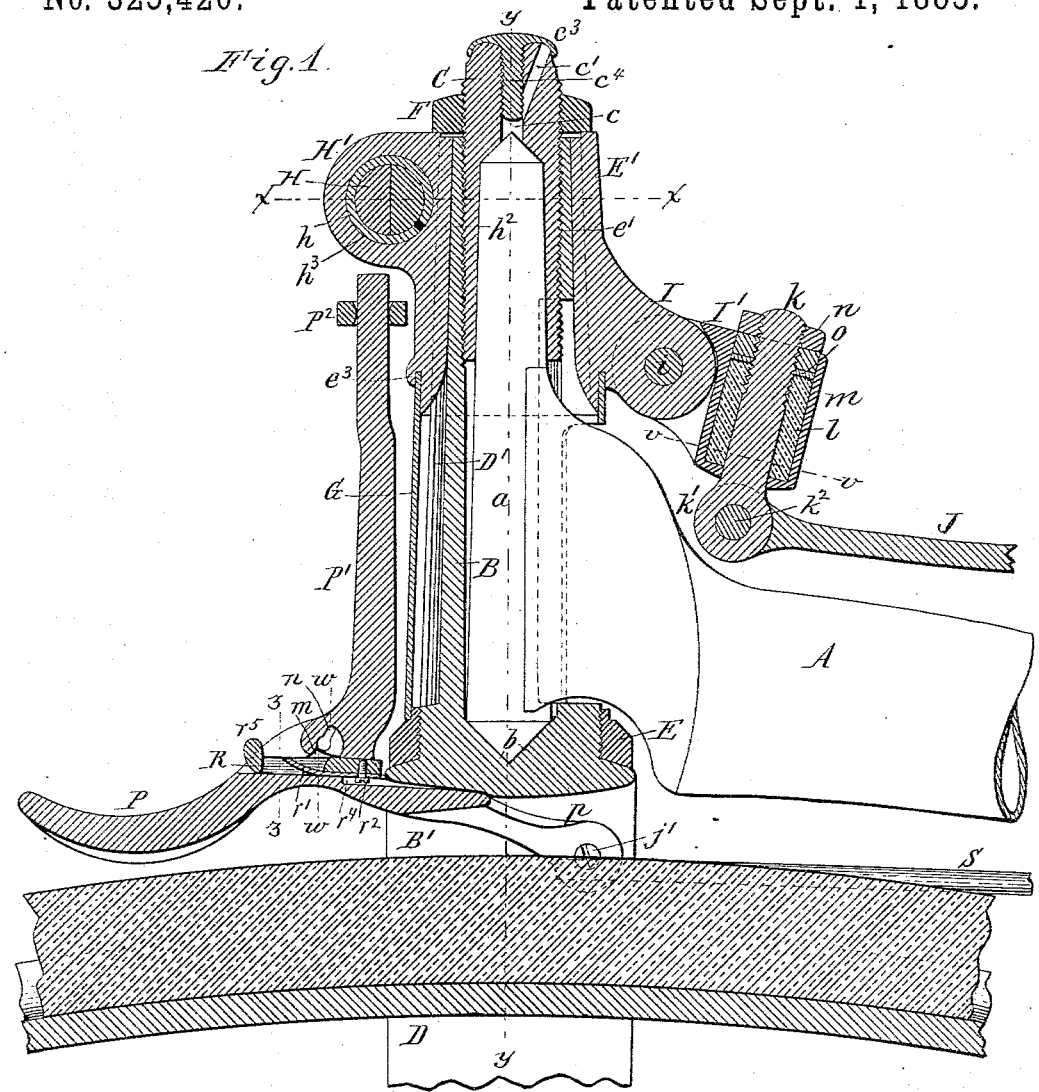
Figure 2:
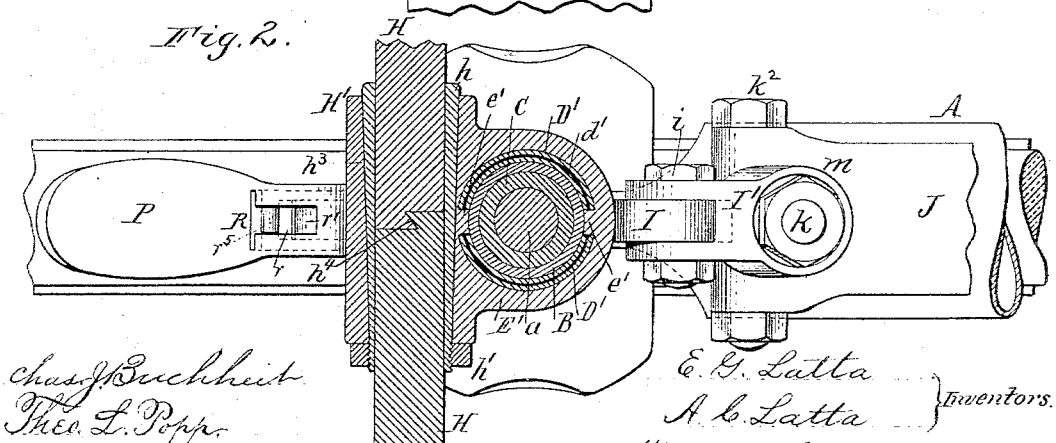
Figure 14:
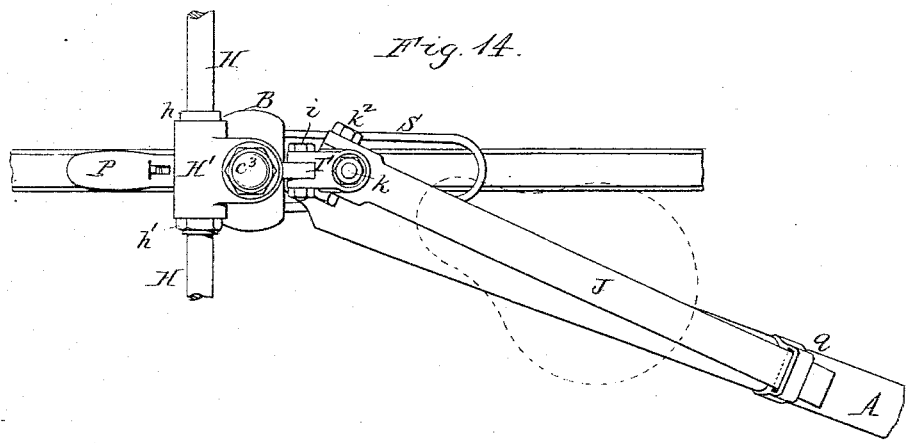
Figure 15:
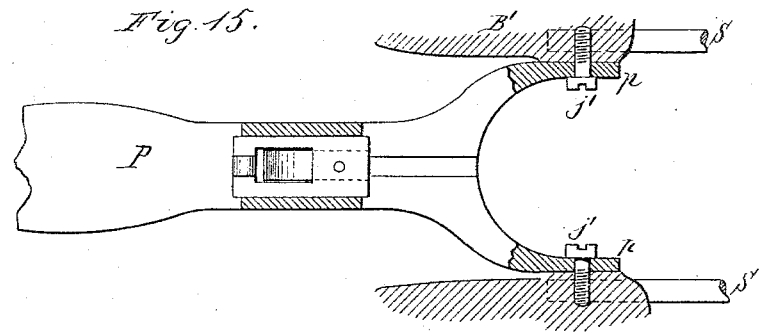

In the accompanying drawings, consisting of three sheets, Figure 1 is a sectional elevation of the upper portion of a velocipede provided with our improvements. Fig. 2 is a horizontal section of the same in line $x\,x$, Fig. 1. Fig. 3 is a vertical cross-section in line $y\,y$, Fig. 1. Fig. 4 is a sectional elevation of the brake-spoon and connecting parts, showing the brake in a locked position. Figs. 5 and 6 are horizontal sections of the head in lines $x\,x$ and $y\,y$, Fig. 3, respectively, at right angles thereto. Figs. 7, 8, and 9 are horizontal sections in lines $z\,z$, $v\,v$, and $w\,w$, Fig. 3, respectively. Fig. 10 is a horizontal section of the saddle-spring-fastening device in line $r\,r$, Fig. 1. Figs. 11 and 12 are vertical cross-sections of the brake-shoe and locking device in lines $w\,w$ and $z\,z$, Fig. 1. Fig. 13 is a fragmentary section of one end of the trouser guard, showing the manner of securing the same to the fork or frame of the machine. Fig. 14 is a fragmentary top plan view of the machine on a reduced scale, showing the driving-wheel at an angle to the perch and saddle. Fig. 15 is a horizontal section of the brake and locking mechanism.

Like letters of reference refer to like parts in the several figures.

A represents the perch or backbone of the machine, provided at its front end with the usual upright center-pin, $a$.

B represents the steering-head, which incloses the center-pin $a$, and provided with a center bearing, $b$, in which the lower end of the center-pin $a$ rests.

C is an adjustable screw-cap, which fits over the upper end of the center-pin $a$ and rests upon the upper end thereof. The cap C is provided with an external screw-thread, which engages in a threaded opening in the upper part of the steering-head B. $c$ is an oil-passage formed centrally in the cap C, above the center-pin, and provided with a lateral branch, $c'$, which opens on one side of the cap C. $c^2$ is a dust-cap adapted to close the opening of the oil-duct $c'$, and provided with a screw, $c^4$, which screws into a threaded opening arranged in line with the oil-duct $c$.

D represents the forks which straddle the driving-wheel, and are secured to the steering-head B. The head B is provided at its lower end with two fork arms or extensions, B' B', to the outer sides of which the forks D are secured by screw-bolts or rivets $d\,d$. The forks D are provided with upward extensions D', which are made concave in cross-section, so as to fit snugly against the outer surface of the head B, as shown in Figs. 2, 5, and 6. The forks are preferably made hollow, and are provided with a lining or stiffening-plate, $d'$, of metal, which materially strengthens the forks at the points which receive the greatest strain. The lining $d'$ is made gradually tapering from its center toward both ends, and it is held in place within the forks by the curves of the forks and the screw-bolts $d$. The extensions D' of the forks are secured to the steering-head below the center-pin $a$ by means of a screw-nut or collar, E, and at their upper ends by a sleeve or collar, E', which surrounds the head and the upper ends of the forks. The outer surface of the head B and fork sides D' taper slightly toward the top, and the bore of the sleeve or collar E' is also slightly tapering, to correspond with the taper of the head, so as to fit snugly over the same. The sleeve E' is forced down by the lock-nut F, which engages with the screw-thread on the cap C, and whereby the upper ends of the extensions D' are pressed against the head B and firmly secured thereto.

$e'$ $e'$ are tongues or lugs formed in the bore of the sleeve or collar E', with their inner faces resting against the surface of the head B. The lugs or projections $e'$ $e'$ fill the spaces between the adjacent edges of the extensions D' on opposite sides of the steering-head, and prevent the collar E' from turning on the head when pulling on the handle-bars. $e^2$ $e^2$ are lugs or projections formed on the steering-head below the center-pin $a$ and in line with the screw-nut or collar E. The extensions D' fit in the spaces between the lugs $e^2$ $e^2$, and are secured in place at this point by the collar E, the lugs $e^2$ of the head preventing any lateral movement or displacement of the forks.

G is a cylindrical dust-guard, which incloses the head B and the extensions D' between the collars E E', and rests with its lower edge upon the collar E, and its upper end in an annular groove or recess, $e^3$, formed in the lower edge of the collar or sleeve E'. This construction forms a closed head, which is neat in appearance and as rigid and durable as an open head, and permits a broken fork side to be easily and quickly replaced without the aid of special tools or skilled labor. The dust-guard G and collars E E' completely hide the head from view, and are preferably plated, to improve their appearance. The parts being small, they can be easily handled and replaced when required. The collars E E' may be made in one piece, and an ordinary dust-shield used, if desired.

H H represent the handle-bars, and H' a horizontal lug formed on the sleeve or collar E', and to which the handle-bars are secured by a tapering split sleeve, $h$, and nut $h'$. The sleeve $h$ is provided with a longitudinal slit or opening, $h^2$, and is made slightly tapering, to conform with the opening $h^3$ in the lug H', and formed at its small end with an external screw-thread, over which engages the nut $h'$, which latter bears against the end of the lug H'. By tightening the nut $h'$ the sleeve is caused to tightly clamp the handle-bars H H as the sleeve is forced into the lug H'. The handle-bars H are provided at their inner ends with overlapping or interlocking hooks $h^4$, which serve to secure both handle-bars within the sleeve and prevent either handle-bar from being withdrawn in case both bars are not securely clamped by the sleeve $h$. The hooks $h^4$ also serve to retain both handles at the same angle when bent handle-bars are used.

The sleeve $h$ may be provided with an external screw-thread, and the opening $h^3$ of the lug H' with an internal screw-thread, so that the sleeve $h$ may be screwed directly into the lug H', or the sleeve $h$ may be driven into the lug and wedged therein. In the event of one of the handle-bars being accidentally broken off close to the lug H', it can be readily inserted in the lug and secured in place by the tapering sleeve $h$.

I represents a rearwardly-projecting lug or bracket made in one piece with the sleeve E', and I' is a block or cylindrical bearing adjustably secured to the bracket I by a pivot-bolt, $i$.

J is the saddle-spring which supports the saddle, and which is secured at its front end to the block I' by a pivot-bolt, $k$, which is arranged at right angles to the bolt $i$.

$l$ represents a cylindrical block of rubber which surrounds the bolt $k$, and which is seated in a socket, $m$, formed in the bearing-block I'. The bolt $k$ is permitted to turn in the rubber cushion $l$, and is held in the socket $m$ by screw-nuts $n$ and washer $o$. The lower end of the bolt $k$ is provided with an eye, $k'$, and is secured to the front end of the saddle-spring by a bolt, $k^2$, which is inserted through the eye $k'$ and the spring J. When the pivot-bolt $k$ is set at an angle to the center-pin, as represented in Fig. 1, the spring is twisted in turning the machine around a curve and the torsion of the spring tends to keep the wheel in a course in line with the perch A. In turning a curve the machine inclines toward the inside of the curve, and the inclined pivot-support of the front end of the saddle-spring causes the latter with its saddle to tip or cant toward the outside of the curve, and permits the rider to sit in an upright position without effort. By inclining the pivot-bolt $k$ in the opposite direction the saddle is tilted toward the inside of the curve, while by adjusting the bolt $k$ to a vertical position parallel with the center-pin $a$ the front end of the saddle is carried to one side of the perch A toward the outside of the curve, as shown in Fig. 14, without twisting the spring or canting the saddle.

By loosening the bolt $i$ the rider can cause the saddle to tip either way and to any desired extent. By supporting the front end of the saddle in this manner the weight of the rider is removed to a great extent from the center-pin and thrown upon the steering-head and forks, and enables the rider in turning short curves to reach the forward or outside pedal more readily, and allows more room between the inner pedal and the saddle at the same time, and also prevents the wheel from coming in contact with the rider's leg, as is the case when the saddle is arranged directly over the perch. By supporting the front end of the saddle on a vertical pivot-support in rear of the center-pin the wheel is not so liable to be deflected out of its course or the rider as liable to be thrown forward, and enables the rider to more readily retain his balance on the machine. When the rider loses his balance, his first impulse is to turn the steering-head in the direction in which he feels inclined to fall, and by turning the steering-head the front end of the saddle is caused to swing on its vertical pivot to one side of the perch, and thereby throw the weight of the rider on the opposite side of the machine, and thus enables the rider to recover his balance and prevents him from falling.

The pivot-bolt $k$ may be secured directly to the bracket I and the bearing I' be dispensed with and the same result obtained. The same result may also be attained by securing the front end of the saddle to the head and its rear end to a bracket secured to the perch, so that the rear end of the saddle will swing to one side of the perch. This latter construction may be more desirable where no spring is employed or a closer build of the machine is required. The rear end of the saddle-spring plays in a clip, $q$, secured to the perch in the usual manner, sufficient side-play being allowed to permit the requisite movement of the front end of the spring.

P represents the brake spoon or shoe, provided with a bifurcated rear portion, $p$, which is pivoted to the inner sides of the arms B' of the head B in rear of the center-pin $a$ by screws $j'$ $j'$.

P' represents an upwardly-projecting arm, formed on the brake-spoon and arranged in front of the steering-head B, and attached at its upper end to the brake-lever P², in the usual manner.

R represents a sliding bolt or brake-lock arranged in an opening, $r$, formed in the brake-spoon and adapted to lock the machine when not in use. The bolt R consists of an open rectangular frame, the rear end of which engages under the steering-head B when the brake is forced against the tire of the wheel and holds the brake in this position and locks the wheel.

$r'$ is a spring secured at its rear end to the under side of the bolt R by a screw, $r^2$. The head of the screw $r^2$ slides in a groove or recess, $l$, formed in the bottom of the opening $r$, and engages against a shoulder, $r^4$, when the bolt is moved outward and prevents the entire withdrawal of the bolt from the brake. The forward end of the spring $r'$ extends upward through the opening in the bolt and engages in a recess, $m$, formed in the brake-shoe, when the bolt is pushed inward, and automatically locks the bolt R in the opening with its rear end under the steering-head B.

$n$ is a key-hole formed in the side of the brake-shoe and communicating with the recess $m$, and $n'$ is a key which is inserted in the opening $n$ and turned therein to release the forward end of the spring $r'$ from the recess $m$ and unlock the bolt.

$r^5$ is a knob or lug formed on the outer end of the bolt R, whereby the latter can be moved forward and backward in the opening $r$. The free end of the spring $r'$, when released from the recess $m$, bears against shoulders $r^6$ formed on opposite sides of the opening $r$ in the brake-shoe and prevents the accidental locking of the bolt.

In applying our brake-lock, the brake-spoon is forced against the rubber tire sufficiently to allow the rear end of the bolt R to be inserted under the head B and permit the end of the spring $r'$ to engage in the recess $m$, whereby the bolt R is held in place and the brake securely locked. By turning the key so that it will bear against the top of the spring $r'$ and force the latter out of the recess $m$, the bolt R is free to be withdrawn and the brake released. The brake may also be locked by means of a bolt or lever secured to the brake-arm P', and bearing against or engaging with the head B.

S represents the U-shaped trouser-guard, arranged above the wheel and secured to the fork or frame of the machine by the screw-bolts $j'$ $j'$, which also serve to connect the rear end of the brake to the machine.

$s'$ are sockets formed in the fork-arms B' so as to intersect the openings which receive the bolts $j'$, at right angles thereto.

The ends of the guard S are provided with a notch or groove, $s^2$, and are inserted in the sockets $s'$, so that the notches or grooves $s^2$ will be in line with the openings which receive screws $j'$. When the screw-bolts $j'$ are secured in their openings, their inner ends extend through the sockets $s'$ and engage in the notches $s^2$, and firmly secure the guard S without any additional fastening.

We do not wish to claim in this application the features of construction of the brake which are claimed in our pending application No. 129,763, filed April 29, 1884.

We claim as our invention—

1. In a velocipede, the combination, with the steering-head B, of forks D, provided with inwardly-curved extensions D', extending upwardly along both sides of the steering-head and removably attached thereto, substantially as set forth.

2. In a velocipede, the combination, with the steering-head B, of forks D, provided with the curved extensions D', arranged on opposite sides of the steering-head B, and a collar or sleeve, E, embracing the extensions D' and securing the same to the steering-head, substantially as set forth.

3. In a velocipede, the combination, with the inclosed head B, of the forks D, provided with curved extensions D', arranged on opposite sides of the head B, collars E E', and tubular dust-guard G, substantially as set forth.

4. In a velocipede, the combination, with an inclosed steering-head provided with a center bearing, $b$, and screw-cap C, of the dust-guard G, collar or sleeve E', and lock-nut F, substantially as set forth.

5. In a velocipede, the combination, with an inclosed steering-head provided with a center bearing, $b$, and screw-cap C, of the removable sleeve E', and lug H' formed on the sleeve E', substantially as set forth.

6. The combination, with the head B, having outwardly-projecting lugs $e^2 e^2$, and forks D, provided with curved extensions D', arranged on opposite sides of the head B, of the screw-nut E and the sleeve or collar E', provided with inwardly-projecting lugs $e' e'$, substantially as set forth.

7. The combination, with the steering-head and lug H', of the handle-bars H H, and a tapered split sleeve whereby the handle-bars are attached to the steering-head, substantially as set forth.

8. The combination, with the steering-head and lug H', of the handle-bars H H, provided at their inner ends with interlocking hooks $h^4$, and a tapered sleeve, $h$, substantially as set forth.

9. The combination, with the steering-head and sleeve E', provided with lug H', of the handle-bars H H, having interlocking inner ends, a connecting tapered split sleeve, $h$, having a screw-thread at one of its ends and a screw-nut, $h'$, substantially as set forth.

10. The combination, with the brake of a velocipede, of a sliding bolt arranged in the brake-shoe, and adapted to lock the brake, substantially as set forth.

11. The combination, with the steering-head and brake, of a locking device interposed between the brake and the steering-head, and adapted to engage with the steering-head and lock the brake, substantially as set forth.

12. The combination, with the steering-head and brake, of a sliding bolt arranged in an opening in the brake-shoe and adapted to engage between the steering-head and the brake-shoe, and a spring secured to said bolt and adapted to automatically engage in a recess in the brake-shoe and lock the brake, substantially as set forth.

13. The combination, with the steering-head and brake, of the sliding bolt R, adapted to engage under the steering-head, and provided with a spring, $r'$, which engages in a recess formed in the brake-shoe and automatically locks the brake, substantially as set forth.

14. The combination, with the steering-head and brake, of a bolt, R, arranged in an opening, $r$, in the brake-shoe, spring $r'$, secured to said bolt and engaging in a recess, $m$, when the brake is locked, opening $n$, communicating with the recess $m$, and key $n'$, whereby the spring is disengaged from the recess and the bolt released, substantially as set forth.

15. The combination, with the steering-head B, having fork-arms B', of the brake P, provided with a bifurcated rear portion, $p$, and pivoted to the arms B' below the head and in rear of the center-pin, substantially as set forth.

16. The combination, with the steering-head and fork, of the brake P, provided with a bifurcated rear portion, $p$, a trouser-guard, S, and screws $j' j'$, whereby the brake and trouser-guard are secured to the forks B', substantially as set forth.

17. The combination, with the steering-head B, constructed with the rearwardly projecting bracket I, of a pivoted bearing, I', forming a support for the front end of the saddle, and attached to the bracket I by a horizontal bolt, $i$, on which it can swing vertically, substantially as set forth.

18. The combination, with the steering-head B, having a bracket, I, of a bearing, I', pivoted to the bracket I by a horizontal bolt, $i$, and a saddle-spring, J, pivoted to the bearing I' by an upright bolt, $k$, substantially as set forth.

19. The combination, with the steering-head B, of a removable sleeve, E', provided with a lug, H', to which the handle-bars are secured, and a bracket, I, forming a support for the front end of the saddle, substantially as set forth.

20. The combination, with the steering-head B and sleeve E', provided with bracket I, of a bearing, I', pivoted to the bracket I, pivot-bolt $k$, seated in a rubber cushion, $l$, formed on the bearing I' and saddle-spring J, substantially as set forth.

Witness our hands this 16th day of July, 1884.

EMMIT G. LATTA.
    ADRIAN C. LATTA.

Witnesses:
 S. M. NORTON,
 S. E. LATTA.